(12) United States Patent
Ohno et al.

(10) Patent No.: US 11,499,821 B2
(45) Date of Patent: Nov. 15, 2022

(54) INSPECTION JIG, GAUGE INSPECTOR, AND METHOD FOR HOLDING GAUGE

(71) Applicant: Mitutoyo Corporation, Kanagawa (JP)

(72) Inventors: Teppei Ohno, Gifu (JP); Mao Kikuchi, Gifu (JP)

(73) Assignee: Mitutoyo Corporation, Kanagawa (JP)

( * ) Notice: Subject to any disclaimer, the term of this patent is extended or adjusted under 35 U.S.C. 154(b) by 273 days.

(21) Appl. No.: 16/805,516

(22) Filed: Feb. 28, 2020

(65) Prior Publication Data

US 2020/0278201 A1 Sep. 3, 2020

(30) Foreign Application Priority Data

Feb. 28, 2019 (JP) .............................. JP2019-036091

(51) Int. Cl.
*G01B 3/22* (2006.01)
*G01B 21/04* (2006.01)

(52) U.S. Cl.
CPC ............. *G01B 21/042* (2013.01); *G01B 3/22* (2013.01)

(58) Field of Classification Search
CPC ................................ G01B 3/22; G01B 21/042
See application file for complete search history.

(56) References Cited

U.S. PATENT DOCUMENTS

2017/0115141 A1* 4/2017 Kurahashi ............ G01B 5/0004

FOREIGN PATENT DOCUMENTS

JP 2015-152561 8/2015

* cited by examiner

*Primary Examiner* — Jamel E Williams
(74) *Attorney, Agent, or Firm* — Oblon, McClelland, Maier & Neustadt, L.L.P.

(57) ABSTRACT

A gauge inspection jig for performing an inspection easily and accurately in a reverse posture with a contact point facing upward when a gauge is inspected. The gauge inspection jig includes a body portion and a coupling portion. The body portion holds a member mounted to a body portion of the gauge. This holds the gauge in the reverse posture. The coupling portion is coupled to the body portion. The coupling portion is couplable to a distal end of a measurement spindle disposed on a gauge inspector to be movable in a measurement axis direction.

9 Claims, 15 Drawing Sheets

CONTACT POINT FACING DOWNWARD

INSPECTION JIG, GAUGE INSPECTOR, AND METHOD FOR HOLDING GAUGE

TECHNICAL FIELD

The present disclosure relates to an inspection jig, a gauge inspector, and a method for holding a gauge.

BACKGROUND ART

International standards by International Organization for Standardization (ISO) and Japanese Industrial Standards (JIS) regulate a measurement property of a gauge, such as a dial gauge, that an error of indication and repeatability of the gauge should be measured in a state in which the gauge is held in a plurality of different postures.

For example, it is regulated that the measurement property, when not designated by a manufacturer, needs to meet values of a maximum permissible error (MPE) and a maximum permissible level (MPL) at any position in a measurement range and in any posture.

Here, the maximum permissible error (MPE) of the gauge is the maximum value of the error of indication that is allowable for an indication value. The maximum permissible level (MPL) is a limit value of a measuring force as an allowable measuring force by specifications.

As a typical example, there is a case where, for example, it is assumed that a user demands that the measurement can be performed in a posture other than a posture in which a contact point faces downward. Accordingly, the manufacturer requires a plan to allow the dial gauge to be inspected in the posture other than the posture in which the contact point faces downward.

For example, a gauge inspector that measures a measurement error and is repeatable in a state where a dial gauge is reversed up and down (reverse posture) has been proposed (Patent Document 1). In this gauge inspector, a part of a gauge where a cap is mounted is inserted into one end of a socket and a male thread disposed on the other end of the socket is screwed into a measurement spindle of the gauge inspector, thus holding the gauge in the reverse posture.

CITATION LIST

Patent Literature

Patent Document 1: JP 2015-152581 A

SUMMARY OF INVENTION

Technical Problem

However, depending on a type of the dial gauge, some dial gauges originally do not include caps. Therefore, the configuration that holds the dial gauge in the reverse posture according to Patent Document 1 cannot be applied to the dial gauge without the cap.

Therefore, there is a demand for a method that can hold a dial gauge in the reverse posture regardless of presence of a cap and enables performance of inspection in the reverse posture by the gauge inspector.

The disclosed embodiments have been made in view of the above circumstances, and an object of the disclosure is to easily and accurately inspect a gauge in a reverse posture with a contact point facing upward when the gauge is inspected.

Solution to Problem

A gauge inspection jig according to a first aspect of the disclosure includes a body portion and a coupling portion. The body portion holds a member mounted to a body portion of a gauge to hold the gauge in a reverse posture. The coupling portion is coupled to the body portion. The coupling portion is couplable to a distal end of a measurement spindle. The measurement spindle is disposed on a gauge inspector to be movable in a measurement axis direction.

A gauge inspection jig according to a second aspect of the disclosure is the above-described gauge inspection jig preferably as follows. A display unit is disposed on a first surface of the body portion of the gauge. The display unit is configured to indicate a measurement result of the gauge. The member mounted to the gauge is disposed on a second surface on a side opposite to the surface on which the display unit is disposed.

A gauge inspection jig according to a third aspect of the disclosure is the above-described gauge inspection jig preferably as follows. The member mounted to the gauge is a first protruding member protruding in a second direction. The second direction is perpendicular to the second surface orthogonal to a first direction as the measurement axis direction of the gauge. The first protruding member has a hole penetrating the first protruding member in a third direction. The third direction is orthogonal to the first and second directions.

A gauge inspection jig according to a fourth aspect of the disclosure is the above-described gauge inspection jig preferably as follows. The body portion includes: a first holding member having a surface perpendicular to the third direction to which the gauge is fixed; and a second holding member that sandwiches the first protruding member with the first holding member in the third direction to hold the first protruding member.

A gauge inspection jig according to a fifth aspect of the disclosure is the above-described gauge inspection jig preferably as follows. The gauge inspection jig includes a first counterbore, a first protrusion, a second counterbore, and a second protrusion. The first counterbore is on a surface opposed to the first protruding member of the first holding member. A part of the first protruding member is fitted into the first counterbore. The first protrusion is insertable into the hole. The first protrusion extends from the first counterbore along the third direction. The second counterbore is on a surface opposed to the first protruding member of the second holding member. A part other than the part of the first protruding member fitted into the first counterbore is fitted into the second counterbore. The second protrusion is insertable into the hole. The second protrusion extends from the second counterbore along the third direction.

A gauge inspection jig according to a sixth aspect of the disclosure is the above-described gauge inspection jig preferably as follows. The gauge inspection jig includes one or more fourth protrusions on a surface opposed to the gauge of the body portion. The fourth protrusions protrude from the opposed surface along the second direction and abut on the second surface of the gauge.

A gauge inspection jig according to a seventh aspect of the disclosure is the above-described gauge inspection jig preferably as follows. The one or more fourth protrusions are configured such that a movement direction of a spindle of the gauge becomes the measurement axis direction of the gauge inspector.

A gauge inspector according to an eighth aspect of the disclosure includes a measurement spindle and a fixing portion. The measurement spindle is movable in a measurement axis direction. The fixing portion is configured to fix a member contacted by a contact point of a gauge held in a reverse posture by a gauge inspection jig. The gauge inspection jig includes: a body portion that holds a member mounted to a body portion of the gauge to hold the gauge in a reverse posture; and a coupling portion coupled to the body portion. The coupling portion is couplable to a distal end of the measurement spindle.

A method for holding a gauge according to a ninth aspect of the disclosure includes: holding a member mounted to a body portion of a gauge by a body portion of a gauge inspection jig to hold the gauge in a reverse posture; and coupling a coupling portion coupled to the body portion and couplable to a distal end of a measurement spindle of a gauge inspector to the measurement spindle.

Advantageous Effects

According to the embodiments of the disclosure, it is possible to easily and accurately inspect the gauge in the reverse posture with the contact point facing upward when the gauge is inspected.

The foregoing and other objects, features, and advantages of the embodiments of the disclosure will be further fully understood from the following detailed description and the accompanying drawings. The accompanying drawings are illustrated for understanding and do not intend to limit the disclosure.

DESCRIPTION OF EMBODIMENTS

Figure 1:
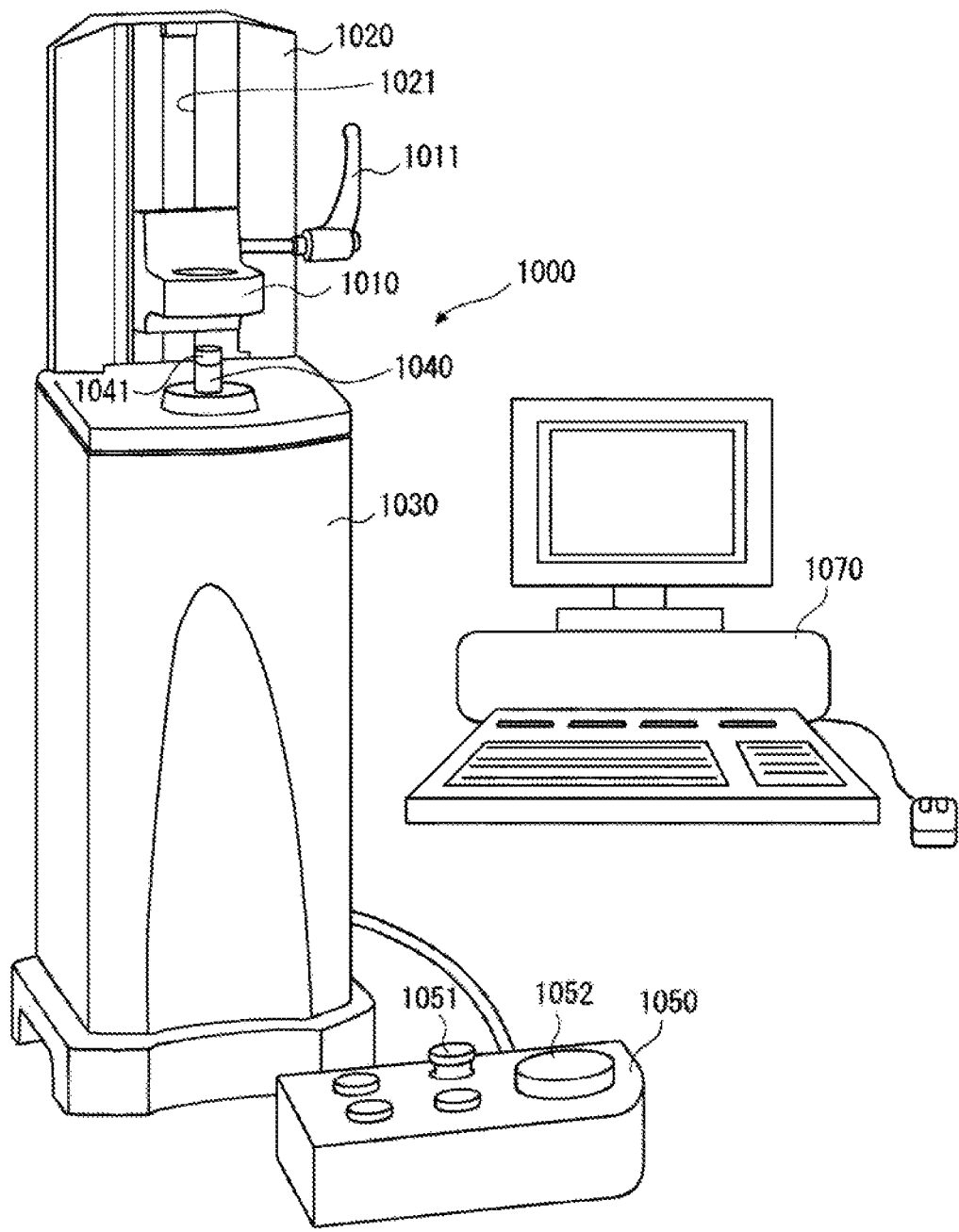
FIG. 1 is a diagram illustrating an appearance of a gauge inspector.

Hereinafter, embodiments of the disclosure will be described with reference to the drawings. In the respective drawings, the same reference numerals are given to the same components, and overlapped descriptions thereof are omitted as necessary.

First Embodiment

Figure 2:
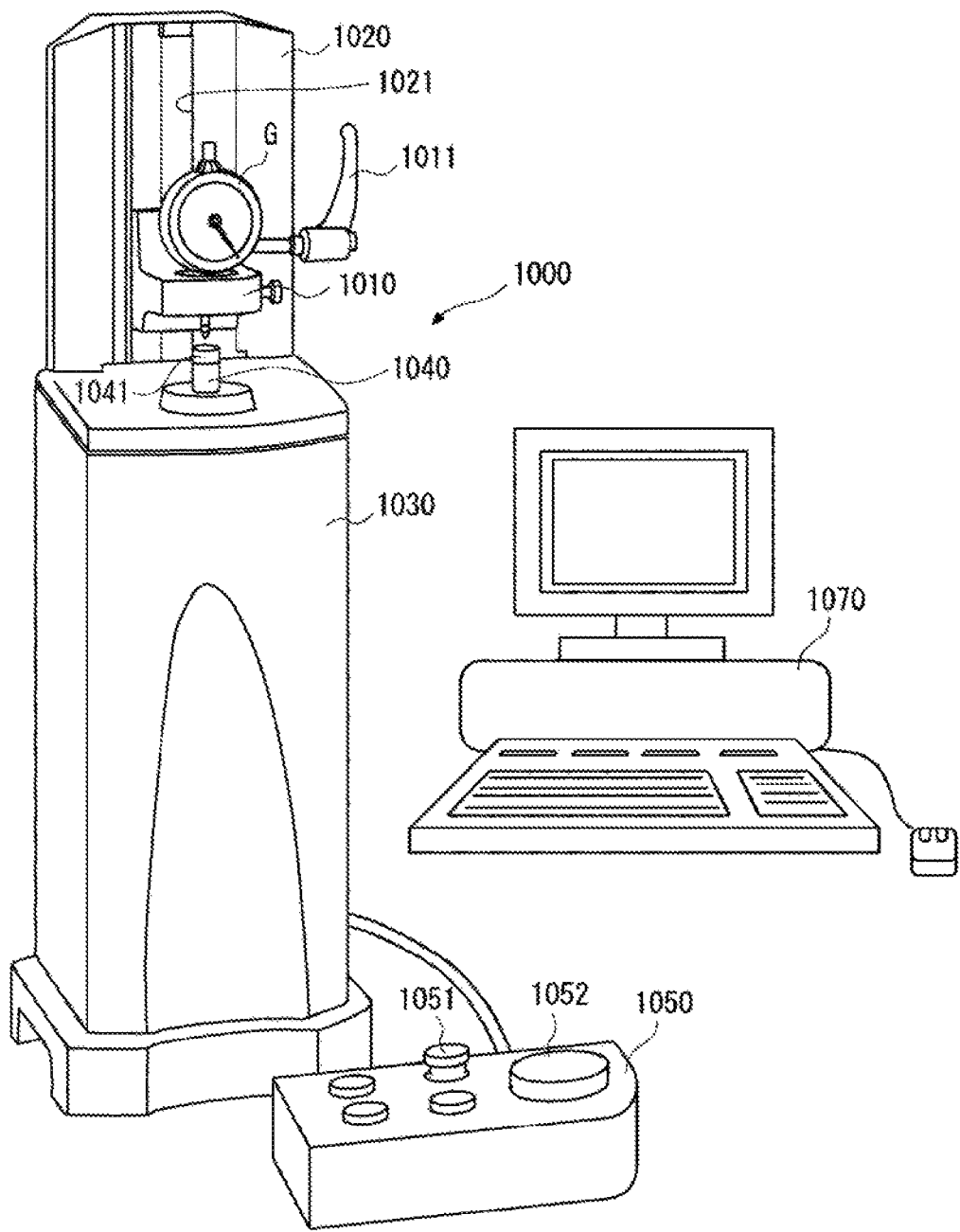
FIG. 2 is a diagram illustrating a state in which a gauge is set to the gauge inspector in a usual posture.

A gauge inspector will be described. FIG. 1 illustrates an appearance of a gauge inspector 1000. FIG. 2 illustrates a state in which a gauge G is set to the gauge inspector 1000 in a usual posture.

The gauge inspector 1000 has a bracket portion 1010 that fixedly holds the gauge G. A stem ST of the gauge G is inserted into the bracket portion 1010, and thus the bracket portion 1010 can fixedly hold the gauge G. Since the gauges G have various sizes, the bracket portion 1010 is disposed to freely move up and down in a height direction (a measurement axis direction, that is, a Z direction described later, and also referred to as a first direction) so as to change its position.

In this example, a backboard 1020 is disposed upright on a housing 1030. A guide rail 1021 guiding the bracket portion 1010 is disposed on the backboard 1020. Thus, the bracket portion 1010 is held to freely move up and down along the guide rail 1021, in short, to be movable in an up-down direction. The position of the bracket portion 1010 can be fixed by operating a handle 1011.

An operation of the gauge inspector 1000 is controlled by a computer 1070. The computer 1070 can also store measurement results by the gauge inspector 1000. When the gauge inspector 1000 is manually operated, such as for adjustment of the position of a measurement spindle 1040, for example, a user can operate a switch 1051 and a jog dial 1052 on an operating unit 1050.

Figure 3:
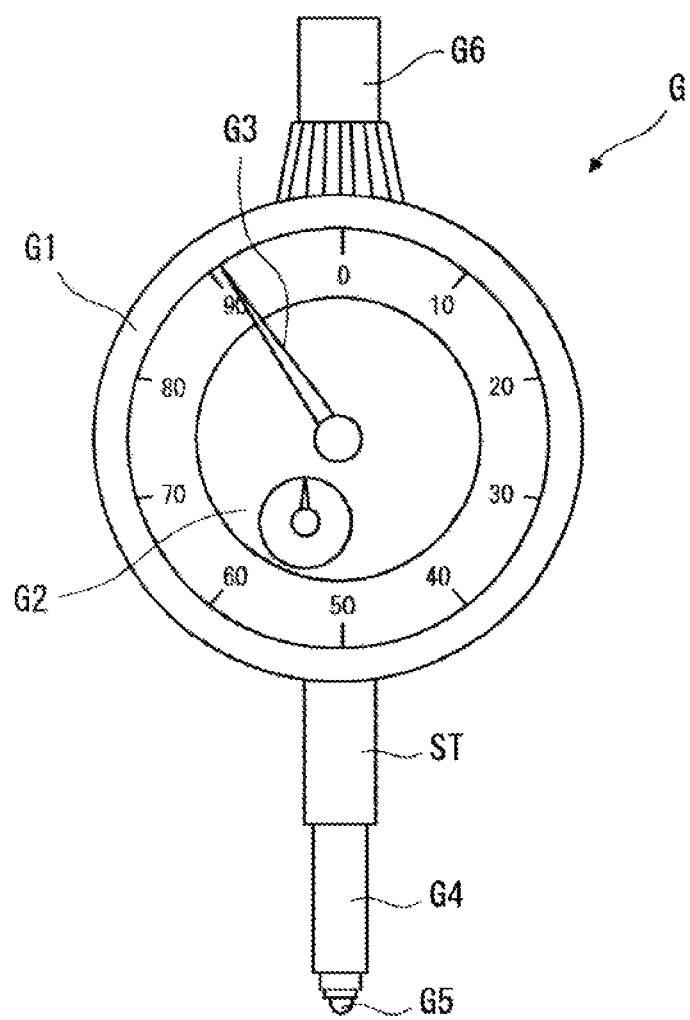
FIG. 3 is a diagram illustrating a configuration example of the gauge.
Figure 4:
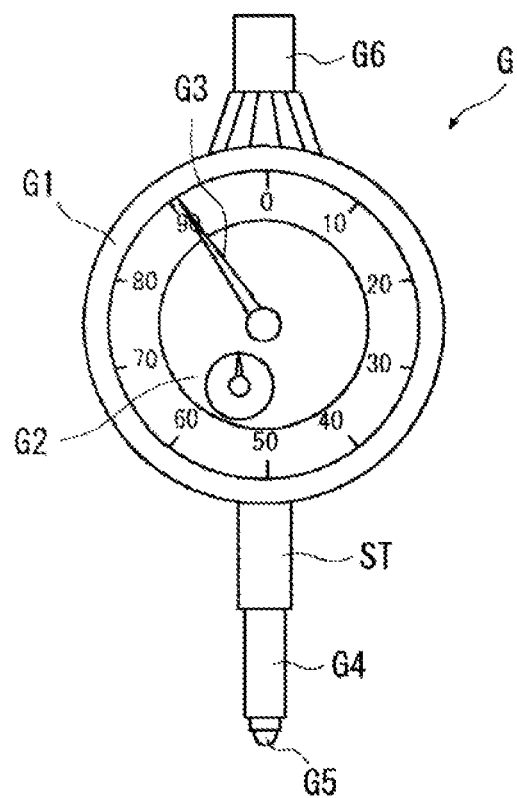
FIG. 4 is a diagram illustrating the gauge with a contact point facing downward (usual posture).
Figure 5:
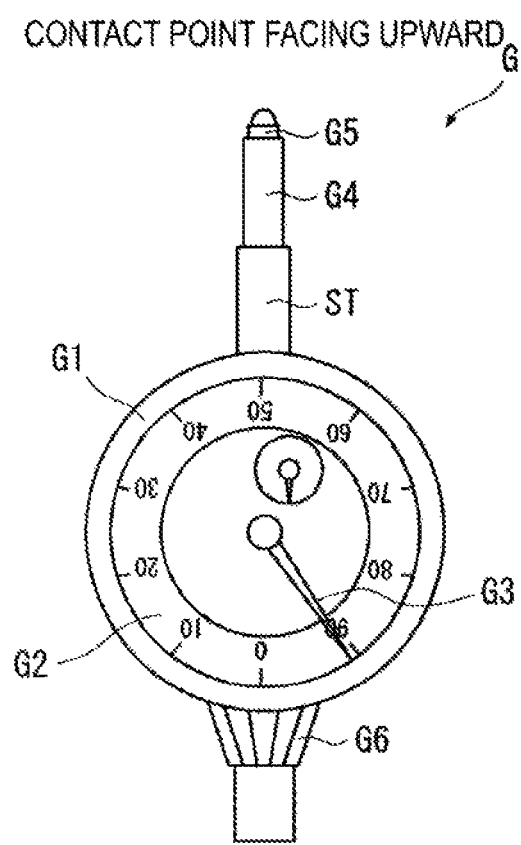
FIG. 5 is a diagram illustrating the gauge with the contact point facing upward (reverse posture).
Figure 6:
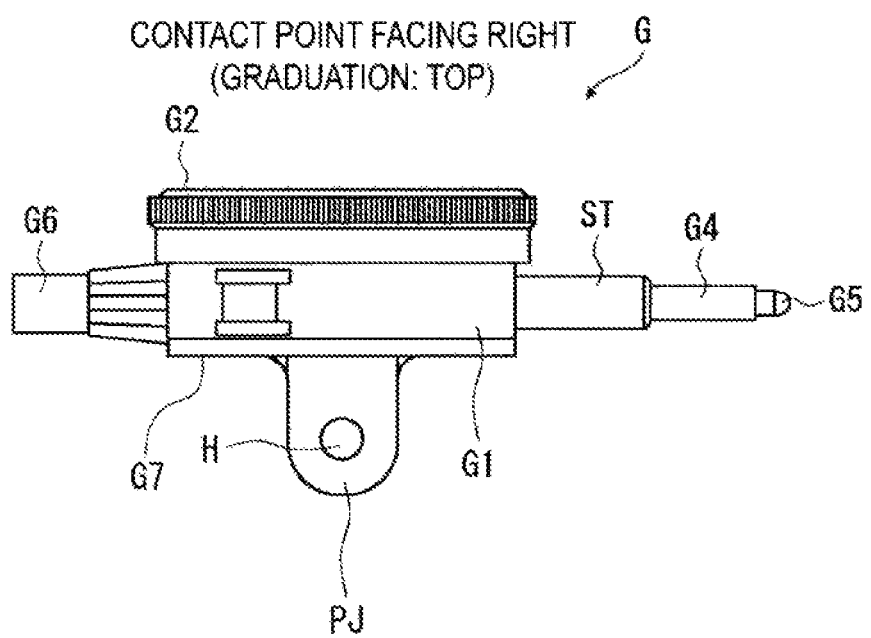
FIG. 6 is a diagram illustrating the gauge with the contact point facing right (note that a graduation faces upward).
Figure 7:
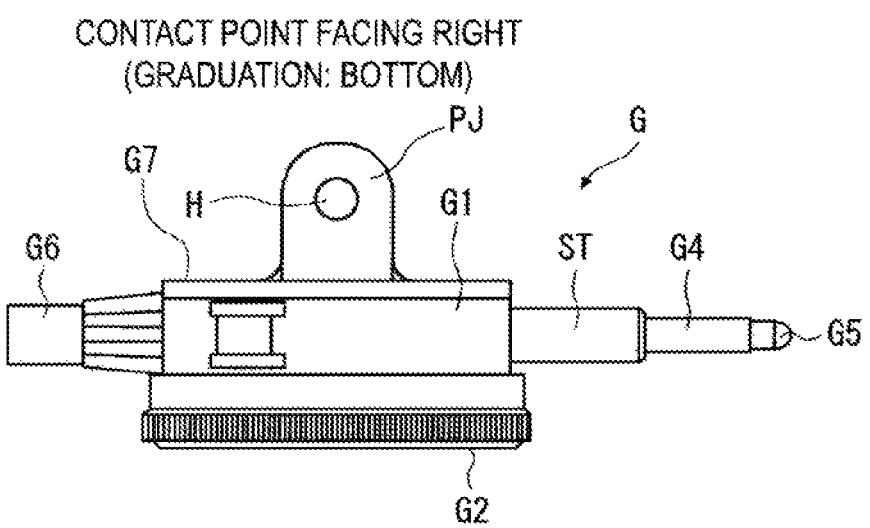
FIG. 7 is a diagram illustrating the gauge with the contact point facing right (note that the graduation faces downward).
Figure 8:
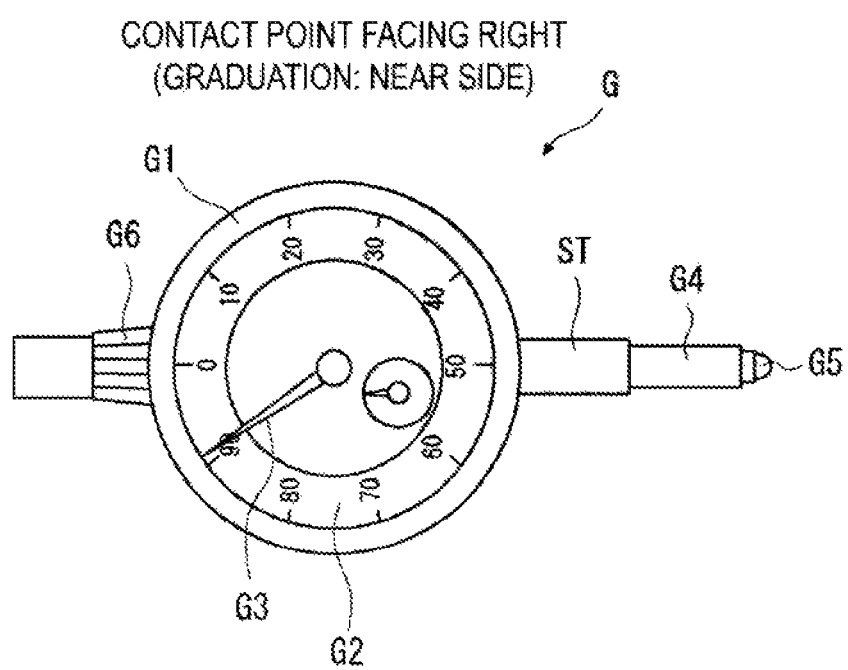
FIG. 8 is a diagram illustrating the gauge with the contact point facing right (note that the graduation faces a near side).
Figure 9:
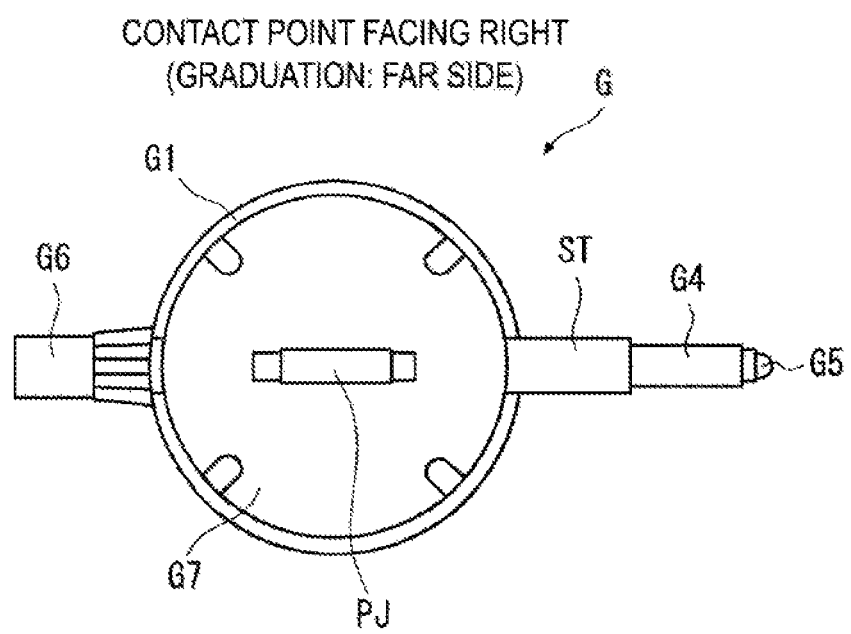
FIG. 9 is a diagram illustrating the gauge with the contact point facing right (note that the graduation faces a far side).

A configuration example of the gauge G will be described. FIG. 3 is a front view of the gauge G. The gauge G includes a cylindrical housing portion G1, a spindle G4 disposed to freely move up and down, and the stem ST projecting from the housing portion G1. A dial (display unit) G2 is disposed on a front surface of the housing portion G1. Inside the housing portion G1, a gear mechanism (not illustrated) that expands a displacement of the spindle G4 and delivers the displacement to an indicator needle G3 is disposed. The spindle G4 has a lower end to which a contact point G5 is disposed. The stem ST slidably supports the spindle G4. The spindle G4 passes through the housing portion G1, and an upper end of the spindle G4 protrudes from the housing portion G1. To protect the upper end portion of the spindle G4, a cap G6 is disposed on a side surface of the housing portion G1.

In addition, a back lid G7 is disposed on a side opposite to the surface (first surface) on which the dial G2 is disposed in the gauge G. A lug PJ protrudes from a surface (second surface) of the back lid G7 in a direction (second direction) perpendicular to the surface. The lug PJ is provided with a hole H penetrating in a direction orthogonal to a direction (second direction) perpendicular to the measurement axis direction and the surface of the back lid G7.

Next, an inspection posture of the gauge will be described. For example, according to a demand from, for instance, the user, a case where the gauge needs to be inspected in various postures other than the usual posture (contact point facing downward) illustrated in FIG. 2 is assumed. Considering, for example, an internal structure of the gauge G, it is considered that the inspection posture of the gauge can be classified into the following six patterns.

The following describes the six patterns of the inspection postures with reference to FIG. 4 to FIG. 9.

(A) Contact point facing downward (usual posture)
(B) Contact point facing upward (reverse posture)
(C) Contact point facing right (Note that a graduation faces upward.)
(D) Contact point facing right (Note that the graduation faces downward.)
(E) Contact point facing right (Note that the graduation faces a near side.)
(F) Contact point facing right (Note that the graduation faces a far side.)

Note that, in the following, "near side" may also be referred to as "front," and "far side" is also referred to as "rear."

According to the posture used by the user, the inspection in one or two or more postures among the six patterns is performed. Note that it is clear that the inspection on the gauge G in the usual posture, which is "(A) Contact point facing downward," can be performed by the original inspection method by the gauge inspector, and therefore the description of the inspection in the usual posture will be omitted in the present embodiment.

In the present embodiment, the inspection of the above-described "(B) Contact point facing upward (reverse posture)" (hereinafter referred to as a reverse posture inspection) will be described. In the present embodiment, the reverse posture inspection is achieved using a jig to set the gauge G to the gauge inspector 1000 in the reverse posture.

Figure 10:
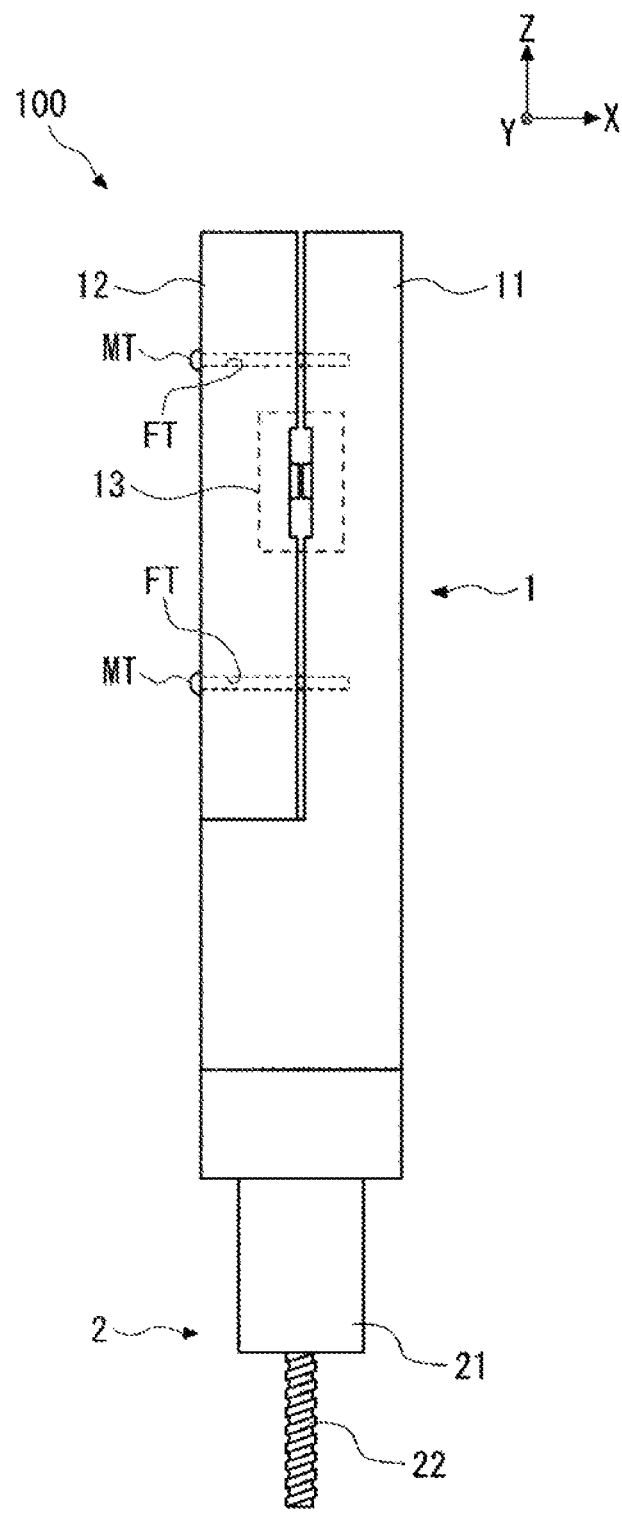
FIG. 10 is a front view schematically illustrating a configuration of a gauge inspection jig according to a first embodiment.
Figure 11:
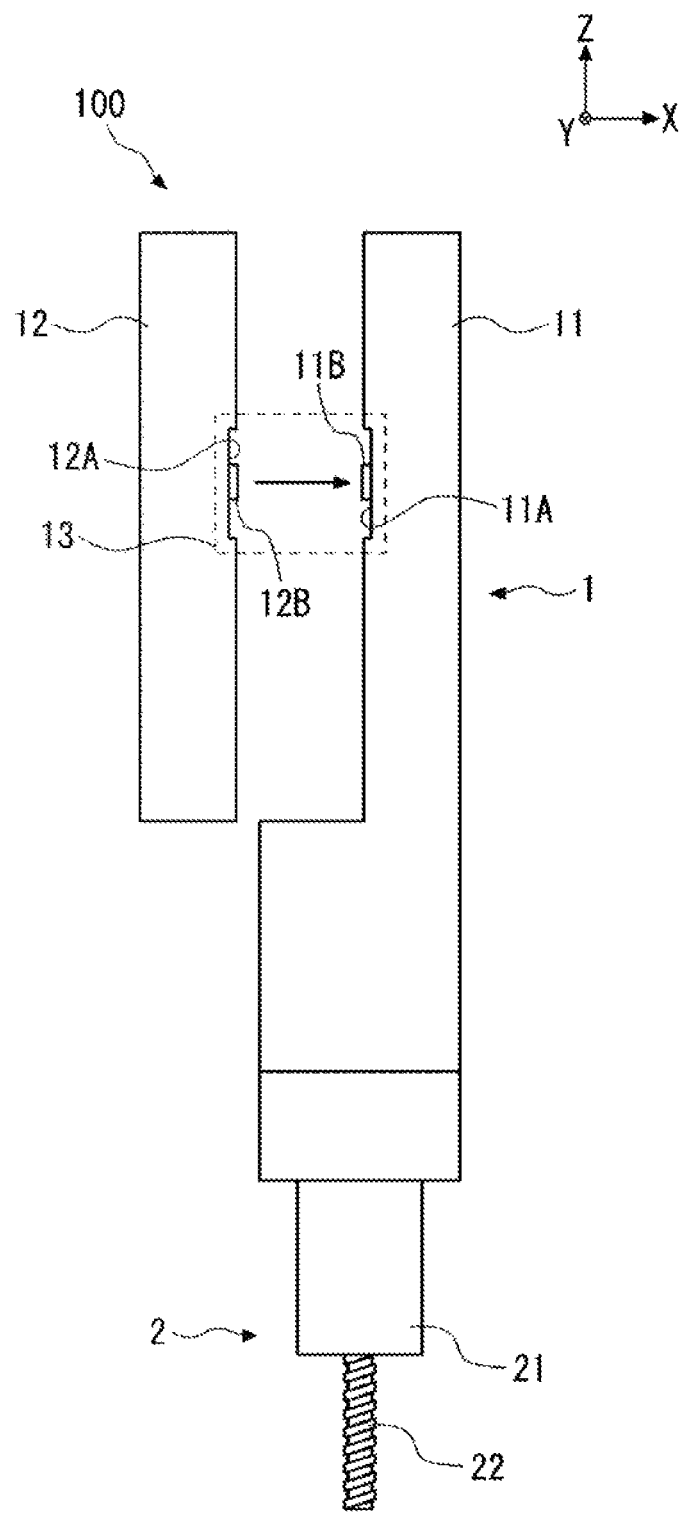
FIG. 11 is a front view schematically illustrating a configuration of the gauge inspection jig according to the first embodiment when two columns of a main body are separated.
Figure 12:
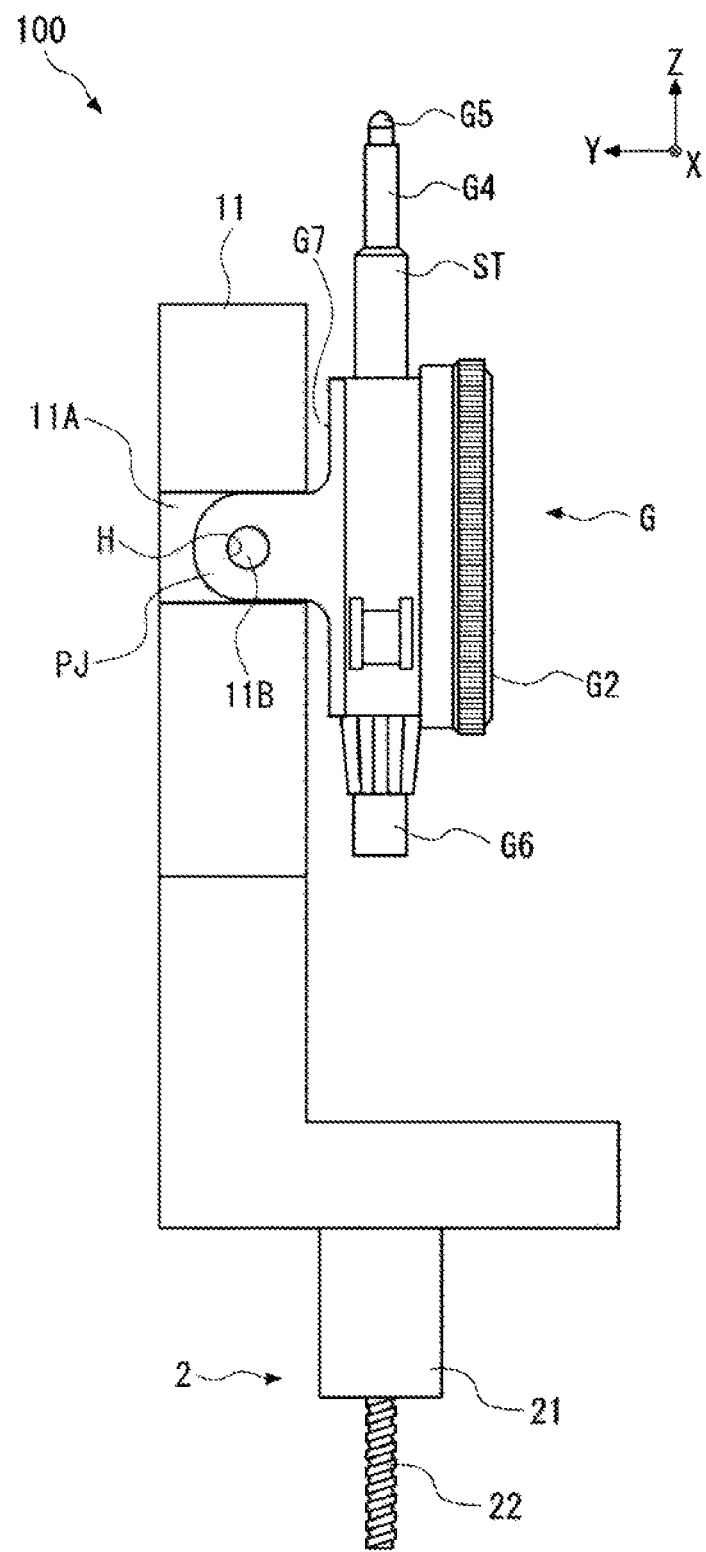
FIG. 12 is a side view schematically illustrating the configuration of the gauge inspection jig according to the first embodiment.

A gauge inspection jig 100 will be described. FIG. 10 is a front view schematically illustrating a configuration of the gauge inspection jig 100 according to the first embodiment. FIG. 11 is a front view schematically illustrating a configuration of the gauge inspection jig 100 when two columns of a body are separated. FIG. 12 is a side view schematically illustrating the configuration of the gauge inspection jig 100 according to a first embodiment. The gauge inspection jig 100 includes a body portion 1 and a coupling portion 2. Note that, for ease of understanding of the configuration, FIG. 12 omits a column 12.

The body portion 1 includes a column 11 and the column 12 (first and second holding members), which are holding members for the gauge. The column 11 is constituted of a member extending in the Y direction at the bottom of the column 11 and a member extending upward (Z (+) direction) from an end on the Y(+) side at the bottom of the column 11. When viewed from the front, the column 11 is configured such that a width in the X direction of the upper side is smaller than a width in the X direction of the lower side. In the present embodiment, a left side surface (a surface on the X (−) side) of the column 11 matches the measurement axis. In other words, a central axes of a columnar member 21 and a male thread 22, described later, of the coupling portion 2 pass through a left side surface (a surface on the X (−) side) on the upper side of the column 11.

The column 12 is configured as a member that can abut the upper side of the column 11 extending in the Z direction. For example, the columns 11 and 12 are provided with female threads FT extending in the X direction. Screwing male threads MT into the female threads FT joins the column 11 and the column 12 together.

A holding portion 13 that holds the lug PJ (first protruding member) of the gauge G is disposed between the column 11 and the column 12. As illustrated in FIG. 11, a counterbore 11A and a protrusion 11B, having a circular shape in cross section, are disposed on the holding portion 13. The counterbore 11A is disposed on a left-side surface (a surface on the X (−) side) of the column 11. The protrusion 11B protrudes from the counterbore 11A up to a position of the left-side surface (the surface on the X (−) side) of the column 11. The protrusion 11B has a shape that can be inserted into the hole H provided in the lug PJ.

A counterbore 12A and a protrusion 12B, having a circular shape in cross section, are disposed. The counterbore 12A is disposed on a right-side surface (a surface on the X (+) side) of the column 12. The protrusion 12B protrudes from the counterbore 12A up to a position of the right-side surface (the surface on the X (+) side) of the column 12. The protrusion 12B has a shape that can be inserted into the hole H provided in the lug PJ.

As illustrated in FIG. 11, the hole H in the lug PJ is coaxially disposed with respect to the protrusions 11B and 12B to join the column 11 and the column 12 together, and thus the protrusions 11B and 12B are inserted into the hole H to ensure holding the gauge G.

Note that while FIG. 10 illustrates a state in which the lug PJ is sandwiched between the column 11 and the column 12 and the male threads MT are screwed into the female threads FT to fix the lug PJ, for simplification, the illustration of the lug PJ is omitted. In FIG. 10, while there is a gap between the column 11 and the column 12, by designing dimensions in the Y-direction of the columns 11 and 12 such that the gap is generated after fixing the lug PJ, the lug PJ can be reliably fixed with the column 11 and the column 12.

The coupling portion 2 includes the columnar member 21 and the male thread 22. The columnar member 21 is a member protruding from a lower surface of a beam, which is disposed on the lower side of the column 11, to the lower side (Z (−) side).

Figure 13:
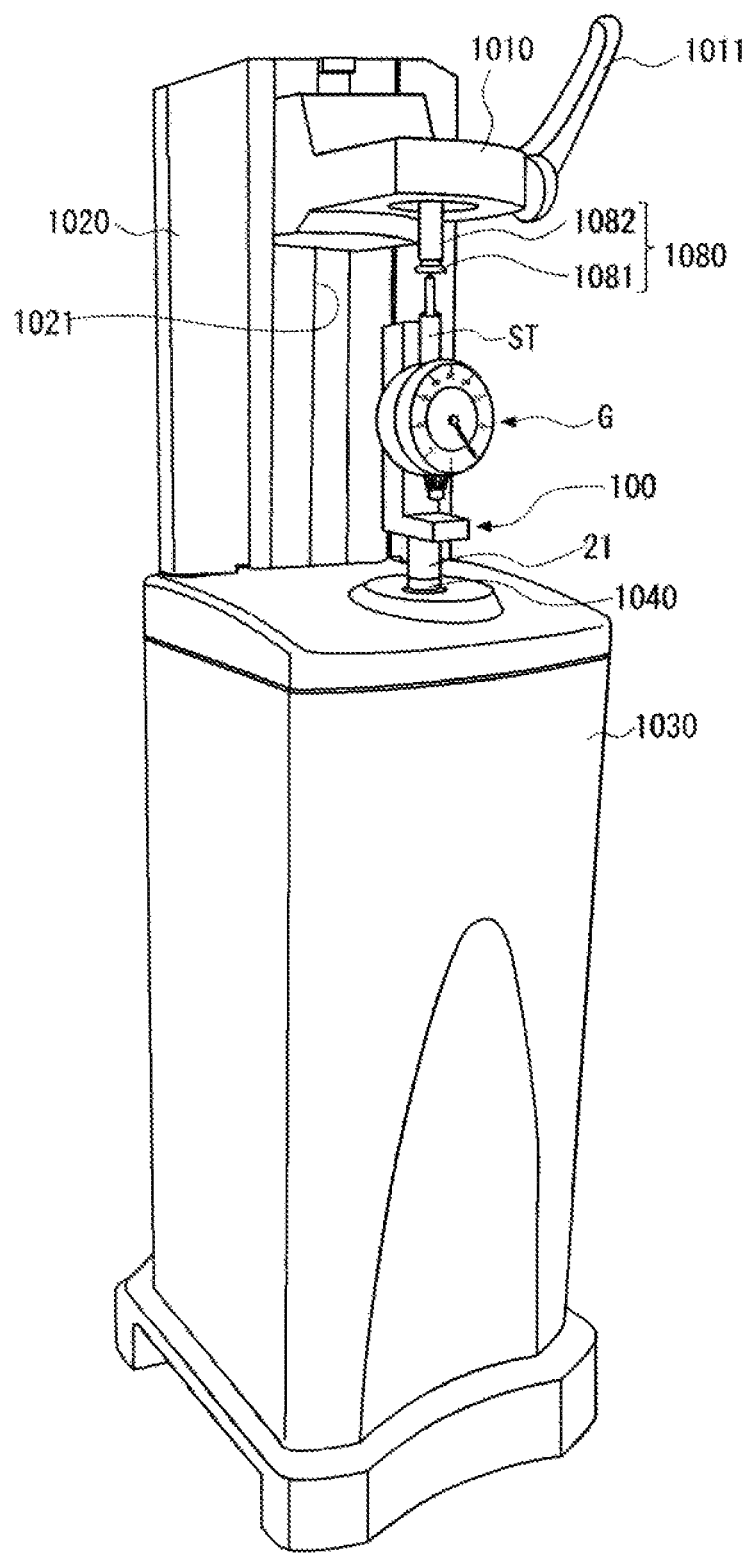
FIG. 13 is a diagram illustrating a method for fixing a coupling portion to a measurement spindle.

Next, a method for performing the inspection with "(B) Contact point facing upward" will be described. FIG. 13 illustrates a method of fixing the coupling portion 2 to the measurement spindle 1040. The male thread 22 of the columnar member 21 is screwed into the measurement spindle 1040 instead of a flat contact point 1041. This fixes the columnar member 21 to the measurement spindle 1040.

Thus, the gauge inspection jig 100 can move up and down in conjunction with moving up and down of the measurement spindle 1040. That is, setting the gauge G to the gauge inspection jig 100 in the reverse posture allows the gauge G in the reverse posture to be moved up and down in the measurement axis direction (Z direction). It is desirable that the bracket portion 1010 be moved sufficiently upward so that the bracket portion 1010 does not interfere with the gauge inspection jig 100 and the gauge G.

When the gauge G is set to the gauge inspector 1000 in the reverse posture, a member for bringing the contact point G5 of the gauge G into contact needs to be disposed on the gauge inspector 1000. In the present embodiment, a contact member 1080 with which the contact point G5 is in contact is mounted to the bracket portion 1010. The contact member 1080 includes a measurement table 1081 and a shaft member 1082.

The shaft member 1082 is a member extending in the Z direction and is held by the bracket portion 1010 so as to protrude to the lower side (Z (−) side). The shaft member 1082 has a lower end (an end portion on the Z (−) side) to which the measurement table 1081 is mounted. The surface on the lower side (Z (−) side) of the measurement table 1081 is configured as a flat surface (X-Y plane), and the measurement table 1081 contacts the contact point G5.

As described above, the gauge G is set to the gauge inspection jig 100 in the reverse posture and the measurement spindle 1040 is moved up and down to bring the contact point G5 in contact with the measurement table 1081, thus inserting the spindle G4 of the gauge G. Accordingly, indication accuracy and repeatability of the gauge in the reverse posture can be measured.

Second Embodiment

Figure 14:
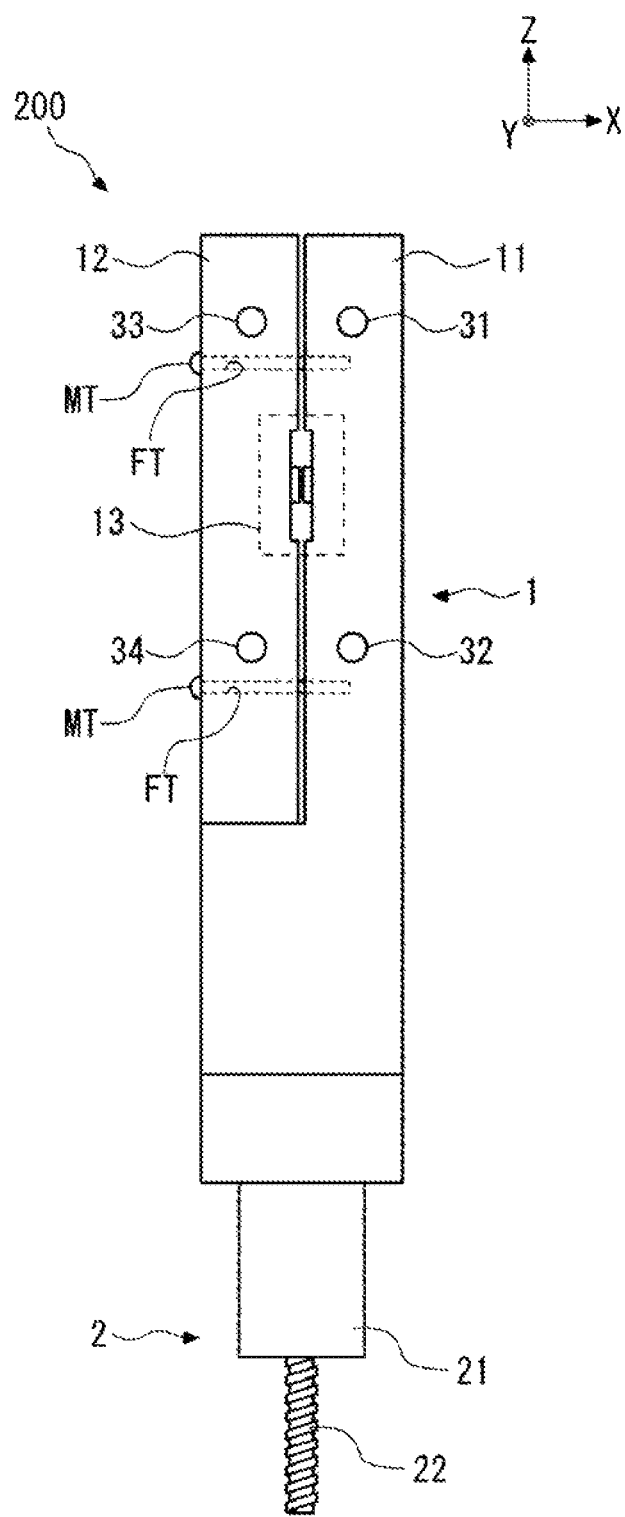
FIG. 14 is a front view schematically illustrating a configuration of a gauge inspection jig according to a second embodiment.
Figure 15:
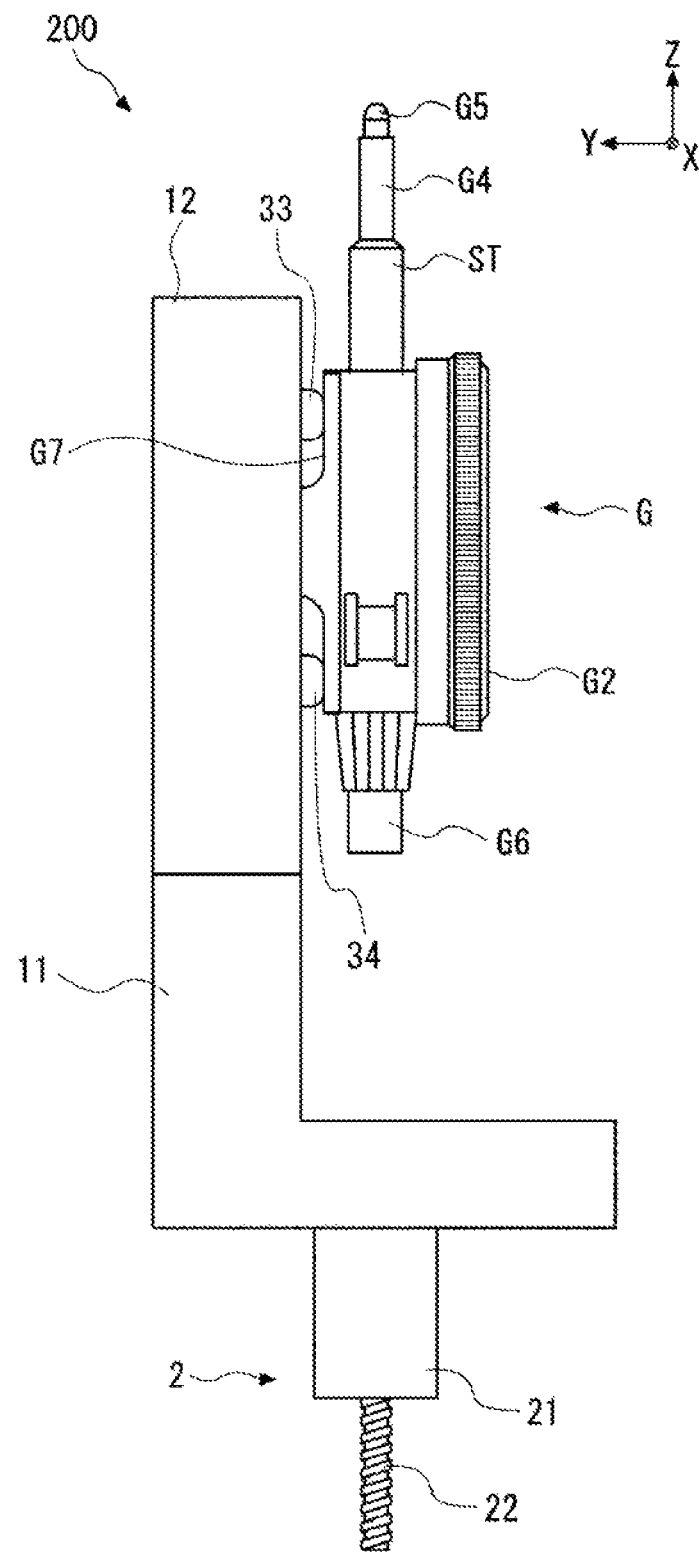
FIG. 15 is a side view schematically illustrating a configuration of the gauge inspection jig according to the second embodiment.

Next, other modified examples of the gauge inspection jig will be described. FIG. 14 is a front view schematically illustrating a configuration of a gauge inspection jig 200 according to the second embodiment. FIG. 15 is a side view schematically illustrating a configuration of the gauge inspection jig 200 according to a second embodiment. The gauge inspection jig 200 has a configuration in which protrusions 31 to 34 are added to the gauge inspection jig 100 according to the first embodiment.

The protrusion 31 is disposed at a position on the upper side (Z (+) side) of the holding portion 13 on a surface (Z-X plane) opposed to the gauge G on the column 11. The protrusion 32 is disposed at a position on the lower side (Z (−) side) of the holding portion 13 on the surface (Z-X plane) opposed to the gauge G on the column 11 so as to be arranged in line with the protrusion 31 in the axis direction (Z direction).

The protrusion 33 is disposed at a position on the upper side (Z (+) side) of the holding portion 13 on the surface (Z-X plane) opposed to the gauge G on the column 12. The protrusion 34 is disposed at a position on the lower side (Z (−) side) of the holding portion 13 on the surface (Z-X plane) opposed to the gauge G on the column 12 so as to be arranged in line with the protrusion 33 in the axis direction (Z direction).

The protrusions 31 to 34 protrude from the surfaces (Z-X plane) opposed to the gauge G of the body portion 1 (columns 11 and 12) in the Y (−) direction by the same distance. Note that the protrusions 31 to 34 may be made from a hard material, such as a metal, or may be made from an elastic material, such as rubber.

Other configurations of the gauge inspection jig 200 are the same as those of the gauge inspection jig 100 according to the first embodiment, and therefore the descriptions thereof will be omitted. The method and the measurement method for setting the gauge inspection jig 200 to the gauge inspector 1000 in the reverse posture are also the same as those of the first embodiment, and therefore the descriptions thereof will be omitted.

Thus, when the gauge G is mounted to the gauge inspection jig 200, the protrusions abut the back lid G7 of the gauge G. As a result, in a case where a torque around the X-axis occurs around the lug when the contact point G5 is in contact with the measurement table 1081 during measurement, a rotation of the gauge G can be prevented. This further allows highly accurate measurement of the gauge G.

Additionally, appropriately designing the amounts of protrusions of the protrusions 31 to 34, an operating direction (sliding direction) of the spindle G4 of the gauge G can be matched with the measurement axis direction (Z direction). This further allows highly accurate inspection with the gauge inspection jig 200.

The protrusions 31 to 34 of the present embodiment are merely examples and are not limited to these examples. That is, one or more (any given number of) protrusions abutting the back lid G7 may be disposed on the surface opposed to the back lid G7 of the gauge G of the body portion 1 (column 11 and column 12).

Other Embodiments

The disclosure is not intended to be limited to the above-described embodiments, and appropriate variations can be made thereon without departing from the essential spirit of the invention. For example, the lug described in the above embodiments is merely one example of a protruding member disposed on the back lid of the gauge. For example, on the back lid of the gauge, a member having another shape, for example, a columnar member, such as a cylinder or a prism, and a male thread protruding from the back lid in the vertical direction may be disposed as a protruding member disposed on the back lid of the gauge. Furthermore, a holding portion according to a shape of the protruding member may be appropriately disposed in the gauge inspection jig.

REFERENCE SIGNS LIST

1 Body portion
2 Coupling portion
11, 12 Column
11A, 12A Counterbore
11B, 12B Protrusion
13 Holding portion
21 Columnar member
22, FT Female thread
31 to 34 Protrusion
MT Male thread
100, 200 Gauge inspection jig
1000 Gauge inspector
1010 Bracket portion
1011 Handle
1020 Backboard
1021 Guide rail
1030 Housing
1040 Measurement spindle
1041 Flat contact point
1050 Operating unit
1051 Switch
1052 Jog dial
1080 Contact member
1081 Measurement table
1082 Shaft member
G Gauge
G2 Dial
G1 Housing portion
G3 Indicator needle
G4 Spindle
G5 Contact point
G6 Cap
G7 Back lid
H Hole
ST stem

The invention claimed is:
1. A gauge inspection jig comprising:
a first body portion connected to a second body portion of a gauge to hold the gauge in a reverse posture; and
a coupling portion coupled to the first body portion, the coupling portion being couplable to a distal end of a measurement spindle, the measurement spindle being disposed on a gauge inspector to be movable in a measurement axis direction.

2. The gauge inspection jig according to claim 1, wherein
a display unit is disposed on a first surface of the second body portion of the gauge, the display unit being configured to indicate a measurement result of the gauge, and
a member mounted to the gauge is disposed on a second surface on a side opposite to the surface on which the display unit is disposed.

3. The gauge inspection jig according to claim 2, wherein
the member mounted to the gauge is a first protruding member protruding in a second direction, the second direction being perpendicular to the second surface orthogonal to a first direction as the measurement axis direction of the gauge, and
the first protruding member has a hole penetrating the first protruding member in a third direction, the third direction being orthogonal to the first and second directions.

4. The gauge inspection jig according to claim 3, wherein the body portion includes:
a first holding member having a surface perpendicular to the third direction to which the gauge is fixed; and
a second holding member that sandwiches the first protruding member with the first holding member in the third direction to hold the first protruding member.

5. The gauge inspection jig according to claim 4, comprising:
a first counterbore on a surface opposed to the first protruding member of the first holding member, a part of the first protruding member being fitted into the first counterbore;
a first protrusion insertable into the hole, the first protrusion extending from the first counterbore along the third direction;
a second counterbore on a surface opposed to the first protruding member of the second holding member, a part other than the part of the first protruding member fitted into the first counterbore being fitted into the second counterbore; and
a second protrusion insertable into the hole, the second protrusion extending from the second counterbore along the third direction.

6. The gauge inspection jig according to any one of claims 3 to 5, comprising
one or more fourth protrusions on a surface opposed to the gauge of the second body portion, the fourth protrusions protruding from the opposed surface along the second direction and abutting on the second surface of the gauge.

7. The gauge inspection jig according to claim 6, wherein
the one or more fourth protrusions are configured such that a movement direction of a spindle of the gauge becomes the measurement axis direction of the gauge inspector.

8. A gauge inspector comprising:
a measurement spindle movable in a measurement axis direction; and
a fixing portion configured to hold a contacting member contacted by a distal contact point of a gauge held in a reverse posture by a gauge inspection jig during operation, wherein
the gauge inspection jig includes:
a first body portion connected to a second body portion of the gauge to hold the gauge in a reverse posture; and
a coupling portion coupled to the first body portion, the coupling portion being couplable to a distal end of the measurement spindle.

9. A method for holding a gauge comprising:
connecting a first body portion of a gauge to a second body portion of a gauge inspection jig to hold the gauge in a reverse posture; and
coupling a coupling portion coupled to the first body portion and couplable to a distal end of a measurement spindle of a gauge inspector to the measurement spindle.

* * * * *